US007454573B2

(12) United States Patent
Buyuktosunoglu et al.

(10) Patent No.: US 7,454,573 B2
(45) Date of Patent: Nov. 18, 2008

(54) COST-CONSCIOUS PRE-EMPTIVE CACHE LINE DISPLACEMENT AND RELOCATION MECHANISMS

(75) Inventors: Alper Buyuktosunoglu, Putnam Valley, NY (US); Zhigang Hu, Ossining, NY (US); Jude A. Rivers, Cortlandt Manor, NY (US); John T. Robinson, Yorktown Heights, NY (US); Xiaowei Shen, Hopewell Junction, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 11/035,350

(22) Filed: Jan. 13, 2005

(65) Prior Publication Data
US 2006/0155933 A1   Jul. 13, 2006

(51) Int. Cl.
*G06F 12/00* (2006.01)
*G06F 13/00* (2006.01)
*G06F 13/28* (2006.01)
(52) U.S. Cl. .............. 711/133; 711/134; 711/136; 711/159; 711/160
(58) Field of Classification Search ............. 711/133, 711/163
See application file for complete search history.

(56) References Cited

U.S. PATENT DOCUMENTS

| 6,502,171 | B1 * | 12/2002 | Arimilli et al. | 711/146 |
| 6,629,210 | B1 * | 9/2003 | Arimilli et al. | 711/141 |
| 6,711,651 | B1 | 3/2004 | Moreno et al. | |
| 2003/0145241 | A1 * | 7/2003 | Hu et al. | 713/320 |
| 2006/0112228 | A1 * | 5/2006 | Shen | 711/133 |

OTHER PUBLICATIONS

Tanenbaum, Andrew. Structured Computer Organization. 194. Prentice Hall, Inc. pp. 10-12.*
Data Forwarding in Scalable Shared Memory Multiprocessors, Koufaty et al, IEEE Transactions on Parallel and distributed systems, vol. 7, No. 12, Dec. 1996, pp. 1250-1264.
Kaxiras, Hu, and Martonosi, Cache Decay: Exploiting Generational Behavior to Reduce Cache Leakage Power, Proceedings of the International Symposium on Computer Architecture, 2001, pp. 240-251.
Lenoski and Weber, Scalable Shared Memory Multi-Processing, Section 1.2.2, pp. 16-20, Morgan-Kaufman, 1995

* cited by examiner

*Primary Examiner*—Kevin Ellis
*Assistant Examiner*—Ryan Bertram
(74) *Attorney, Agent, or Firm*—Ference & Associates LLC

(57) ABSTRACT

A hardware based method for determining when to migrate cache lines to the cache bank closest to the requesting processor to avoid remote access penalty for future requests. In a preferred embodiment, decay counters are enhanced and used in determining the cost of retaining a line as opposed to replacing it while not losing the data. In one embodiment, a minimization of off-chip communication is sought; this may be particularly useful in a CMP environment.

21 Claims, 3 Drawing Sheets

Operations of the embodiment

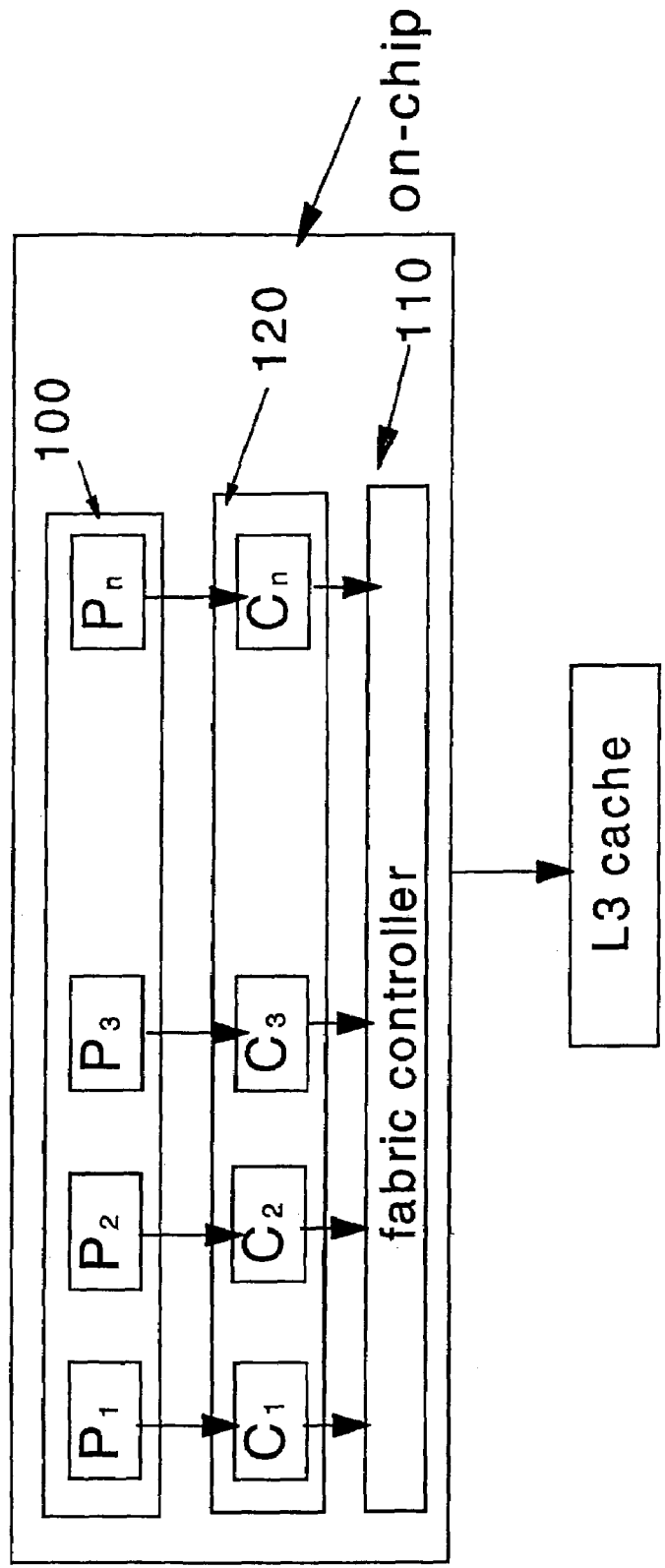
FIGURE 1: Multiprocessor system with shared cache banks

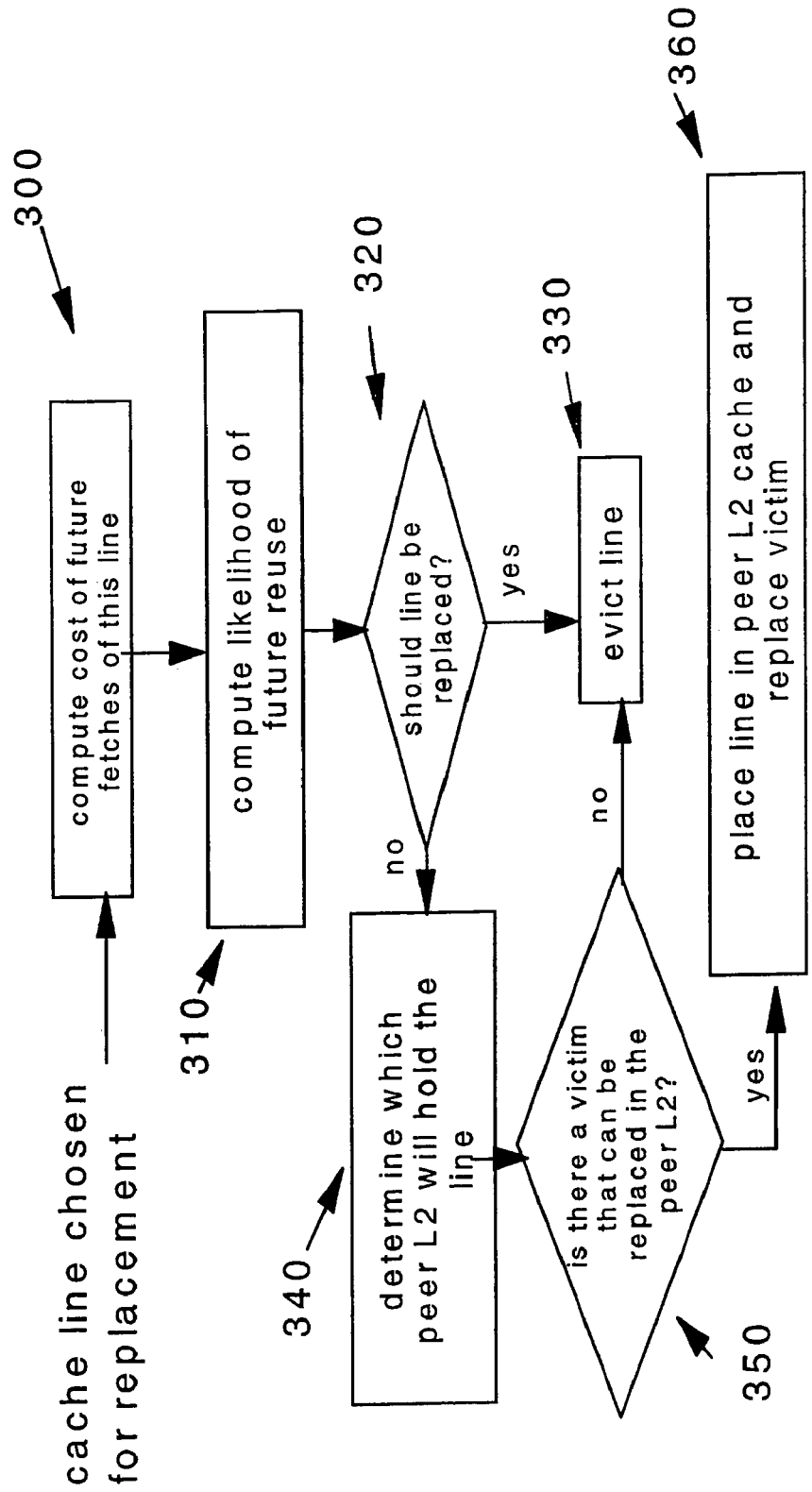

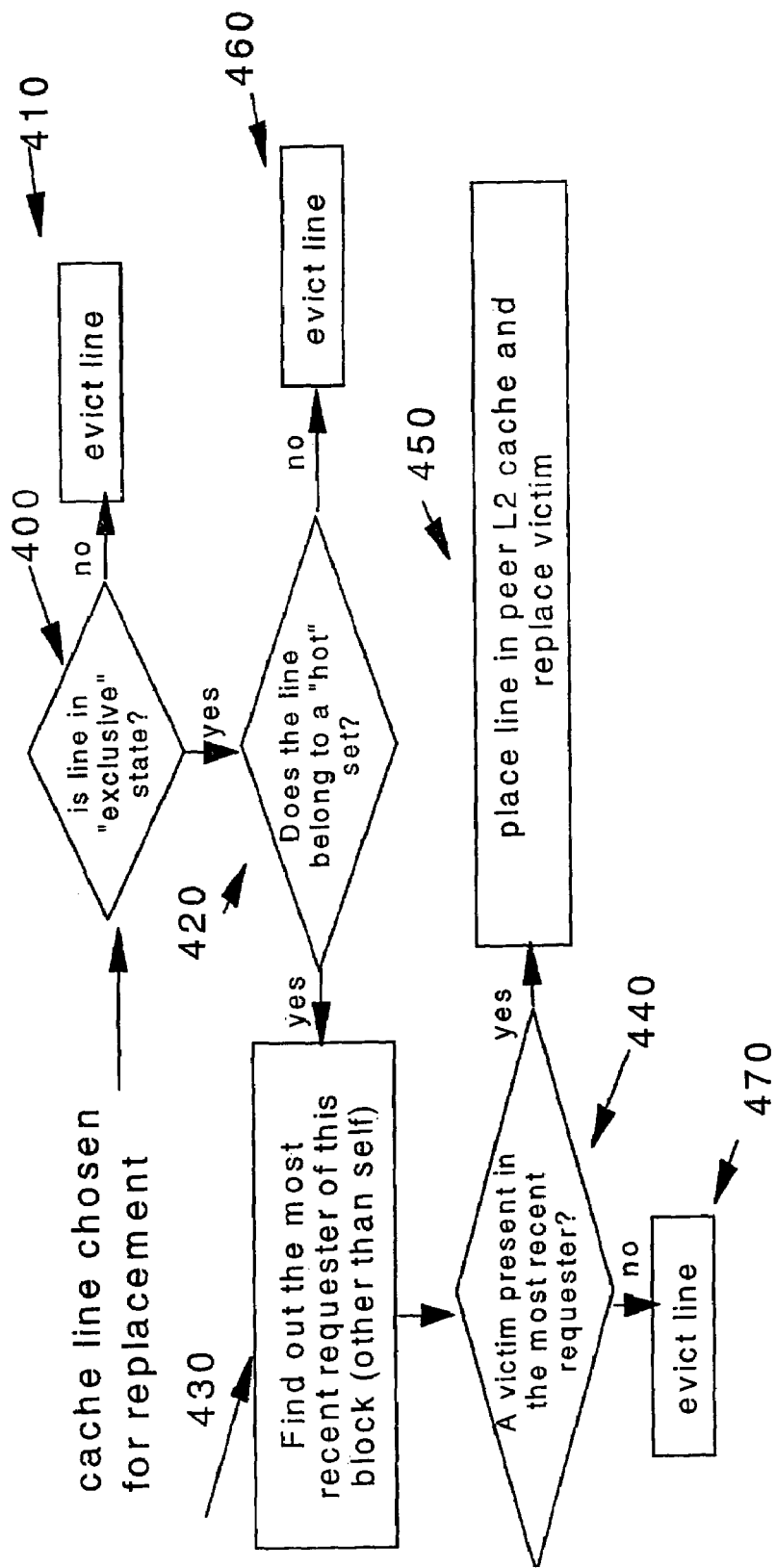
FIGURE 3: High-level operation of embodiment

COST-CONSCIOUS PRE-EMPTIVE CACHE LINE DISPLACEMENT AND RELOCATION MECHANISMS

This invention was made with Government support under Contract No.: NBCH30390004 awarded by DARPA. The Government has certain rights in this invention.

FIELD OF THE INVENTION

The present invention generally relates to the management of caches in a multiple processor system. More specifically, the invention relates to the relocation of cache lines among multiple caches in a system with coherent cache memories using cost-based mechanisms.

BACKGROUND OF THE INVENTION

The present invention deals with cache line relocation among multiple caches in systems with coherent cache memories. Related art includes mechanisms for data forwarding in shared-memory multiprocessors as described in "Data Forwarding in Scalable Shared Memory Multiprocessors", Koufaty et al, IEEE Transactions on Parallel and Distributed Systems, vol. 7, no. 12, December 1996, pages 1250-1264. In this approach, usage patterns based on traces or compile-time analysis are used to determine cases where one data item, when used by one processor, should be forwarded to the caches of other processors identified as consumers of the data item. This approach is limited in that (1) producer/consumer relationships must be identified using offline analysis of traces or compile-time analysis; (2) data items are forwarded using only identified producer/consumer relationships; and (3) data items are forwarded without regard to cost, for example without consideration as to whether the forwarded data item replaces more "useful" (in terms of improving system performance) data.

Among other related efforts is U.S. Pat. No. 6,711,651, Moreno et al, assigned to IBM, issued Mar. 23, 2004, "Method and Apparatus for History-Based Movement of Shared-Data in Coherent Cache Memories of a Multiprocessor System using Push Prefetching". In this approach, a consume-after-produce table, implemented in hardware as part of the cache controller, is used to identify producer/consumer relationships for cache lines among multiple caches in a coherent cache memory system. A limitation of this approach is that cache lines are prefetched without regard to cost, for example (as previously described) without consideration as to whether the cache line replaces a more "useful" (in terms of improving system performance) cache line.

It would therefore be advantageous to relocate cache lines among multiple caches in a coherent cache memory system using cost-based mechanisms, that is, in such a fashion that overall system performance is always expected to be improved. One issue in evaluating the cost of relocating a cache line, which in general will replace another cache line, is the probability of re-reference for the two respective cache lines. As is well-known, this is highly correlated with cache line age, with more recently accessed cache lines being far more likely to be re-referenced than less recently accessed cache lines.

In view of the foregoing, a need has been recognized in connection with overcoming the shortcomings and disadvantages presented by conventional arrangements.

SUMMARY OF THE INVENTION

In accordance with at least one presently preferred embodiment of the present invention, there is broadly contemplated a hardware based method for determining when to migrate cache lines to the cache bank closest to the requesting processor to avoid remote access penalty for future requests. In a preferred embodiment, decay counters are enhanced and used in determining the cost of retaining a line as opposed to replacing it while not losing the data. Decay counters have previously been studied for power saving applications, as described for example in Kaxiras, Hu, and Martonosi, Cache Decay: Exploiting Generational Behavior to Reduce Cache Leakage Power, Proceedings of the International Symposium on Computer Architecture, 2001, pp. 240-251. In contrast, in one aspect of the present invention, decay counters may be used in order to determine whether a cache line will be relocated using a cost-based mechanism.

In one embodiment of the present invention, a minimization of off-chip communication is sought; this may be particularly useful in CMP environment.

In summary, one aspect of the invention provides an apparatus for effecting cache management, the apparatus comprising: an arrangement for displacing data from a cache block; an arrangement for ascertaining a new cache location for displaced data; the ascertaining arrangement being adapted to determine the suitability of one or more candidates for a new cache location via at least one of: determining a cost of re-fetching the replaced data; determining a likelihood of future reference to the replaced data; and determining whether a candidate is able to retain the replaced data.

Another aspect of the invention provides a method of effecting cache management, the method comprising the steps of: displacing data from a cache block; ascertaining a new cache location for displaced data; the ascertaining arrangement step comprising determining the suitability of one or more candidates for a new cache location via at least one of: determining a cost of re-fetching the replaced data; determining a likelihood of future reference to the replaced data; and determining whether a candidate is able to retain the replaced data.

Furthermore, an additional aspect of the invention provides a program storage device readable by machine, tangibly embodying a program of instructions executable by the machine to perform method steps for effecting cache management, the method comprising the steps of: displacing data from a cache block; ascertaining a new cache location for displaced data; the ascertaining arrangement step comprising determining the suitability of one or more candidates for a new cache location via at least one of: determining a cost of re-fetching the replaced data; determining a likelihood of future reference to the replaced data; and determining whether a candidate is able to retain the replaced data.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 schematically illustrates a multiprocessor system with shared cache banks.

FIG. 2 is flow chart of a preferred embodiment of the present invention.

FIG. 3 is a flow chart in accordance with the present invention.

DESCRIPTION OF THE PREFERRED EMBODIMENTS

FIG. 1 is a block diagram of a data processing system which includes multiple processors 100, multiple banks of cache 120, and a fabric controller 110, residing on-chip. The data processing system also includes an off-chip L3 cache. In the computer system shown in FIG. 1, data of an address can often be placed in more than one place. For simplicity of explanation it may be assumed that the cache banks Ci (where i=1, 2, . . . n) form the second level of the memory hierarchy, namely, the L2 cache. In such a computer system the access time of the shared cache banks (Ci) is not uniform from all the processors Pi (where i=1, 2, . . . n), and for best performance cache blocks are duplicated across multiple banks in order to be accessible to the processors with the minimum access time possible. For example, shared data of an address can be cached in multiple caches at the same time, and exclusive data can be migrated from one cache to another when a request is made. For a more detailed description of the structure of multiprocessor caches see (for example) Section 1.2.2 in "Scalable Shared Memory Multi-Processing", by Lenoski and Weber, pages 16-20, Morgan-Kaufman, 1995. Although an exemplary chip multi-processing (CMP) system is used in discussions of the present invention, it is understood that the present invention can be applied to symmetric multi-processing (SMP) systems that include multiple chips, or multiprocessor systems in general.

In such a computer system, it is generally desirable to displace (or replace) data from a cache block if the data is unlikely to be needed for a reasonable amount of time in the future. After the data is replaced (or displaced), the cache block can be turned off to reduce power consumption, or can be used to hold data of another address. When a cache block is replaced from an L2 cache bank, it is often desirable to relocate the replaced data in a peer L2 cache bank if the replaced data is the only copy on the chip, and if the replaced data is likely to be used (by a processor on the same chip) in the near future. Caching the replaced data in a peer cache can reduce latency of a future cache miss regarding the replaced data, since latency of accessing data from an on-chip L2 cache is usually much smaller than latency of retrieving data from the off-chip L3 cache. Furthermore, it can reduce bandwidth consumption of off-chip communications, especially when the replaced cache block has been modified. A desirable objective addressed herein is found in determining the usefulness of a candidate chosen for replacement and to accommodate useful candidates in peer L2 cache banks.

The structure and operations of the cost-conscious method to determine the candidate for replacement, and to accommodate the chosen candidate in a peer L2 cache bank is now described. FIG. 2 shows a high-level flowchart describing three key operations proposed herein, namely, (a) Determine cost of re-fetching the replaced block
(b) Determine likelihood of future reference to replaced block
(c) Determine which peer L2 will retain the replaced block These operations are discussed in more detail herebelow.

a) Determine cost of re-fetching the replaced block (300): When a block is chosen for replacement, the cost of re-fetching the block (if needed) from an off-chip L3 is estimated. In one illustrative embodiment the state of the cache block can be used as an estimator of this cost. For example, if the cache block is in "exclusive" state (or if it is the only copy, shared or exclusive, in this chip), then it is estimated that it is cost-effective to retain this block (if possible) in other peer L2 caches on the same chip instead of replacing it to the L3 cache. In other embodiments it is possible to estimate the cost by at least one or more of the following: the latency of off-chip accesses, off-chip bandwidth, the state of the cache block, and power consumption. For example, if the estimated power consumption to access the block from off-chip L3 cache exceeds a set threshold value, it is determined to be cost-effective to retain this block (if possible) in other peer L2 caches on the same chip.

b) Estimate likelihood of future reference to replaced block (310): When a block that has been chosen for replacement is unlikely to be needed in the (near) future, it may be cost-effective to evict this block, independent of whether the cost of re-fetching the block is determined to be high in step 300. Therefore, the usefulness of the block in future has to be estimated before replacing it. In one illustrative embodiment, a decay counter is maintained per block, and an n-bit saturating residency counter is maintained per congruence class (or set) of the cache. All the counters are initialized to zero at the beginning. When a block is replaced before the decay counter value reaches a threshold (as explained in Kaxiras et al., supra) the residency counter of the congruence class is incremented by 1. Otherwise, it is decremented by 1. When the n-bit counter value is greater than or equal to $2^{n-1}$ then the cache set (congruence class) can be marked "hot". Any block replaced from a "hot" set is deemed useful in the near future. In other embodiments, the likelihood of referencing the block in future can be determined by one of more of the following: the conflict misses in the given cache set, and the frequency of accesses to the block. For example, last-access timestamp can be maintained per congruence class, and an n-bit counter can track the frequency of accesses to a congruence class. When a congruence class is accessed, if the difference between the last-access timestamp and the current time is less than a set threshold number of cycles, the n-bit counter can be incremented by 1. Otherwise, it can be decremented by 1. When the n-bit counter value is greater than or equal to $2^{n-1}$ the congruence class can be deemed to be frequently accessed. Blocks chosen from frequently accessed congruence classes can be deemed useful in future.

c) Determine which peer L2 will retain the replaced block (320): When a cache block is replaced, the relocation prediction can be performed at the displacing side (i.e. the cache from which the data is replaced), the targeting side (i.e. a cache that can potentially accept the replaced data), or both. In one illustrative embodiment, the cache block usage by other processors on-chip can be tracked. For example, by tracking the most recent requester of the block (other than self), the block can be forwarded to that requester. This can be accomplished by maintaining the identifier (the processor number) of the most recent requestor for each block. In another embodiment, the "hot" sets of the caches can be tracked, and the data can be forwarded to that L2 with a relatively "cold" set. When the block is relocated, the target cache can determine the cost accepting the relocated block using the method explained in step (b) above.

FIG. 3 summarizes the operation of the above embodiment. When cache block B is chosen for replacement, if it is an "exclusive" block, i.e., block B is the only copy of that block in the L2 cache, 400, it is deemed that the cost of re-fetching block B from the L3 cache in the future is high. If on the other hand, block B is a "shared" block present in one or more peer L2 caches, then block B is replaced with the assumption that a future request may be satisfied by one of the other copies present in the cache, 410. If block B is "exclusive", the usage of the corresponding cache set is analyzed, 420. As explained in step (b) above, if the n-bit counter value is greater than or equal to $2^{n-1}$ then the cache set (congruence class) is marked "hot", and block B is deemed to be useful in the near future.

If the corresponding cache set is not "hot", then block B is replaced, 460. For each cache block, the most recent processor that requested that cache block (other than self) is also tracked as explained in (c) above. If block B is determined to be useful in the future, then the most recent requester of block B is queried to find if it will accept block B, 430. The most recent requester can also use the same policy described in 400 and 410 to determine if there is victim block ready for replacement. If a victim is found in the most recent requester's L2 cache, 440, then block B is moved to the most recent requester's L2 cache, and the victim is replaced, 450. If the most recent requester determines that all its currently resident blocks are useful, then block B is replaced, 470.

It is to be understood that the present invention, in accordance with at least one presently preferred embodiment, includes an arrangement for displacing data from a cache block and an arrangement for ascertaining a new cache location for displaced data. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprised of a computer processor configured for executing a computer program stored in computer memory so as to effect cache management, said apparatus comprising:
    an arrangement for displacing data from a cache block;
    an arrangement for ascertaining a new cache location for displaced data;
    wherein said ascertaining arrangement determines the suitability of one or more candidates for a new cache location via at least one of:
    determining a cost of re-fetching the displaced data,
    determining a likelihood of future reference to the displaced data, and
    determining whether a candidate is able to retain the displaced data;
    wherein said ascertaining arrangement determines the suitability of one or more candidates for a new cache location via determining a likelihood of future reference to the displaced data; and
    wherein said ascertaining arrangement employs a decay counter corresponding to each candidate cache block to determine a likelihood of future reference to the displaced data; and
    wherein said ascertaining arrangement employs a residency counter per congruence class to determine a likelihood of future reference to the displaced data; and
    wherein the likelihood of future reference to displaced data corresponds to a threshold being reached in the residency counter; and
    wherein the residency counter threshold is $2^{n-1}$, where n represents a count of instances in which a cache block belonging to a corresponding congruence class is displaced before the decay counter reaches a predetermined decay threshold.

2. The apparatus according to claim 1, wherein said ascertaining arrangement determines the suitability of one or more candidates for a new cache location via all three of:
    determining a cost of re-fetching the displaced data,
    determining a likelihood of future reference to the displaced data, and
    determining whether a candidate is able to retain the displaced data.

3. The apparatus according to claim 1, wherein said ascertaining arrangement seeks an on-chip peer cache as a suitable candidate for a new cache location.

4. The apparatus according to claim 3, wherein said ascertaining arrangement seeks a peer L2 cache as a suitable candidate for a new cache location.

5. The apparatus according to claim 1, wherein said ascertaining arrangement determines the suitability of one or more candidates for a new cache location via determining a cost of re-fetching the displaced data.

6. The apparatus according to claim 5, wherein said ascertaining arrangement determines the cost of re-fetching based on a state of a candidate cache block.

7. The apparatus according to claim 6, wherein said ascertaining arrangement estimates that a cost of re-fetching is cost-effective if a candidate cache block is an exclusive copy, or represents the only copy of a shared cache block within a chip.

8. The apparatus according to claim 1, wherein said ascertaining arrangement determines the suitability of one or more candidates for a new cache location via determining whether a candidate is able to retain the displaced data.

9. The apparatus according to claim 8, wherein said ascertaining arrangement employs cache block usage data among candidates for a new cache location.

10. The apparatus according to claim 9, wherein said ascertaining arrangement employs cache block usage data wherein the most recent requester of a candidate cache block is tracked.

11. A method of effecting cache management, said method comprising the steps of:
    displacing data from a cache block;
    ascertaining a new cache location for displaced data;
    said ascertaining arrangement step comprising determining the suitability of one or more candidates for a new cache location via at least one of:
    determining a cost of re-fetching the displaced data,
    determining a likelihood of future reference to the displaced data, and
    determining whether a candidate is able to retain the displaced data;
    wherein said ascertaining step comprises determining the suitability of one or more candidates for a new cache location via determining a likelihood of future reference to the displaced data; and
    wherein said step of determining a likelihood of future reference comprises employing a decay counter corresponding to each candidate cache block; and
    wherein said step of determining a likelihood of future reference further comprises employing a residency counter per congruence class to determine a likelihood of future reference to the displaced data; and wherein the likelihood of future reference to displaced data corresponds to a threshold being reached in the residency counter; and wherein the residency counter threshold is $2^{n-1}$, where n represents a count of instances in which a cache block belonging to a corresponding congruence class is displaced before the decay counter reaches a predetermined decay threshold.

12. The method according to claim 11, wherein said ascertaining step comprises determining the suitability of one or more candidates for a new cache location via all three of:
   determining a cost of re-fetching the displaced data,
   determining a likelihood of future reference to the displaced data, and
   determining whether a candidate is able to retain the displaced data.

13. The method according to claim 11, wherein said ascertaining step comprises seeking an on-chip peer cache as a suitable candidate for a new cache location.

14. The method according to claim 13, wherein said seeking step comprises seeking a peer L2 cache as a suitable candidate for a new cache location.

15. The method according to claim 11, wherein said ascertaining step comprises determining the suitability of one or more candidates for a new cache location via determining a cost of re-fetching the displaced data.

16. The method according to claim 15, wherein said step of determining a cost of re-fetching comprises determining the cost of re-fetching based on a state of a candidate cache block.

17. The method according to claim 16, wherein said step of determining the cost of re-fetching based on a state of a candidate cache block comprises estimating that a cost of re-fetching is cost-effective if a candidate cache block is in an exclusive state or represents the only or last copy of a shared cache block.

18. The method according to claim 11, wherein said ascertaining step comprises determining the suitability of one or more candidates for a new cache location via determining whether a candidate is able to retain the displaced data.

19. The method according to claim 18, wherein said step of determining whether a candidate is able to retain the displaced data comprises employing cache block usage data among candidates for a new cache location.

20. The method according to claim 19, wherein said step of employing cache block usage data comprises tracking the most recent requester of a candidate cache block.

21. A computer program storage device readable by computer processor machine, tangibly embodying a program of instructions executable by the computer processor machine to perform method steps for effecting cache management, said method comprising the steps of:
   displacing data from a cache block;
   ascertaining a new cache location for displaced data;
   said ascertaining arrangement step comprising determining the suitability of one or more candidates for a new cache location via at least one of:
   determining a cost of re-fetching the displaced data,
   determining a likelihood of future reference to the displaced data, and
   determining whether a candidate is able to retain the displaced data;
   wherein said ascertaining step comprises determining the suitability of one or more candidates for a new cache location via determining a likelihood of future reference to the displaced data; and
   wherein said step of determining a likelihood of future reference comprises employing a decay counter corresponding to each candidate cache block; and
   wherein said step of determining a likelihood of future reference further comprises employing a residency counter per congruence class to determine a likelihood of future reference to the displaced data; and
   wherein the likelihood of future reference to displaced data corresponds to a threshold being reached in the residency counter; and
   wherein the residency counter threshold is $2^{n-1}$, where n represents a count of instances in which a cache block belonging to a corresponding congruence class is displaced before the decay counter reaches a predetermined decay threshold.

* * * * *